H. C. BAQUIE.
AUTOMATICALLY OPERATING PNEUMATIC WHEEL FOR MOTOR AND OTHER VEHICLES.
APPLICATION FILED SEPT. 4, 1919.

1,418,515.

Patented June 6, 1922.
2 SHEETS—SHEET 1.

Inventor-
Hubert C. Baquie,
By- B. Singer,
Atty.

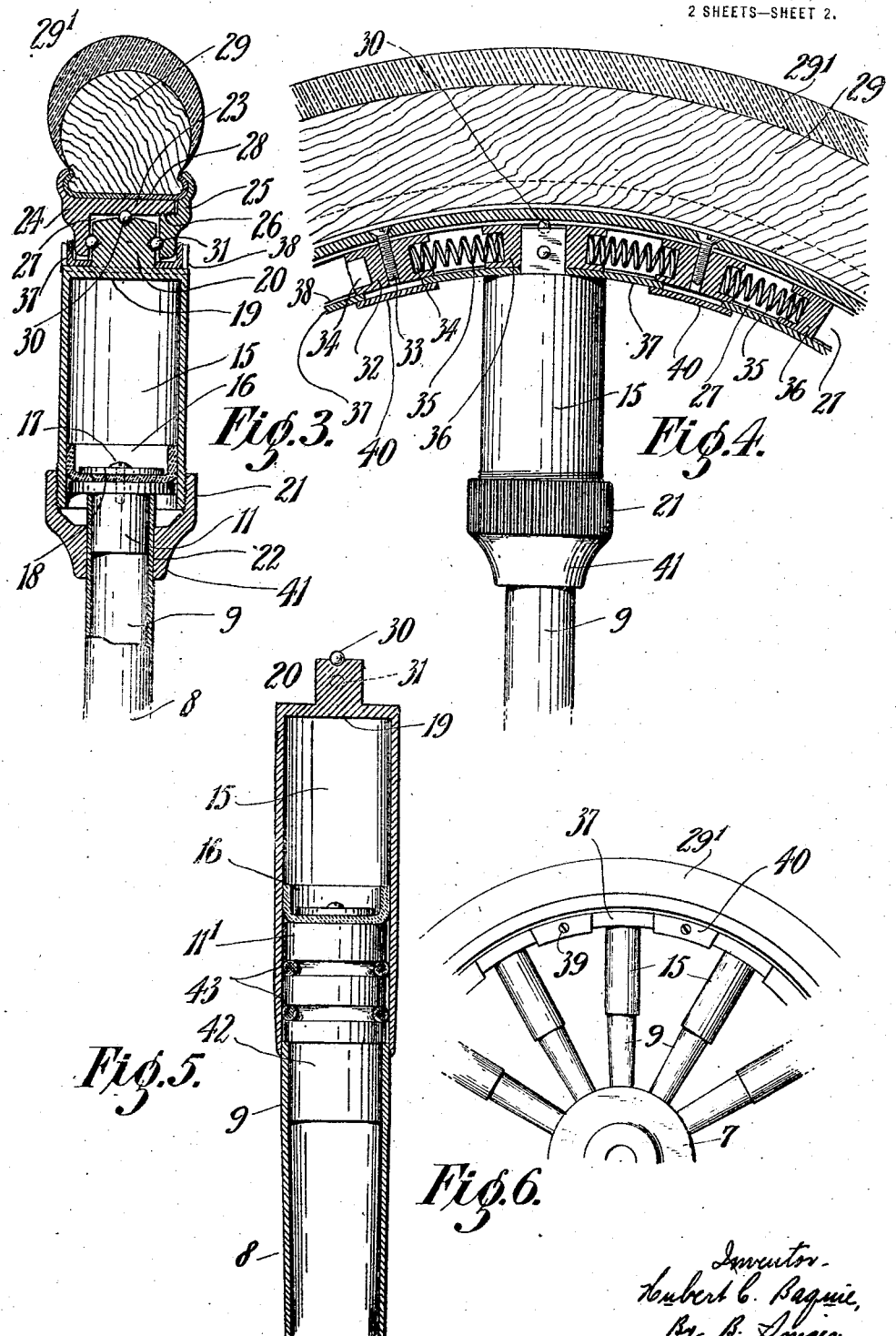

UNITED STATES PATENT OFFICE.

HUBERT CHARLES BAQUIE, OF NORTH CARLTON, NEAR MELBOURNE, VICTORIA, AUSTRALIA.

AUTOMATICALLY-OPERATING PNEUMATIC WHEEL FOR MOTOR AND OTHER VEHICLES.

1,418,515. Specification of Letters Patent. Patented June 6, 1922.

Application filed September 4, 1919. Serial No. 321,725.

*To all whom it may concern:*

Be it known that I, HUBERT CHARLES BAQUIE, residing at North Carlton, near Melbourne, in the State of Victoria, Commonwealth of Australia, have invented certain new and useful Improvements in Automatically-Operating Pneumatic Wheels for Motor and Other Vehicles, of which the following is a specification.

This invention relates to improvements in and connected with pneumatic wheels for motor-cars and other vehicles, and it has been devised in order to provide an improved and automatically operating pneumatic wheel having a solid tyre.

Wheels furnished with pneumatic tyres, as distinct from wheels of the type to which this invention relates have many advantages over ordinary wheels fitted merely with solid tyres, or wheels of a merely resilient nature and known as spring wheels. One such advantage is the provision of an air cushion between the axle and the road surface, and another advantage is the well-known action of a pneumatic or soft rubber tyre to fold resiliently over a small obstruction.

In order that these and other advantages of the pneumatic or air-inflated tyre might be obtained without the actual use of such, there have been devised pneumatic wheels having solid rubber tyres.

In an automatically operating pneumatic wheel according to the present invention, there are provided means for the automatic operation of the air cushioning mechanism, means whereby the use of a solid rubber tyre is dispensed whilst retaining the advantages of the same; means permitting the angular relative displacement of the wheel rim on the wheel spokes, the latter being fitted in an annular race; a tubular spoke construction; means whereby the spokes can be detached from both the hub and the rim of the wheel; a resilient power transmitting connection between the spokes and the rim; means for effectively excluding dust or other foreign matter from the working parts of the improved wheel and for retaining lubricant therein; a rim having separable annular parts and a detachable tyre channel independent of said rim.

The invention consists of the features of construction, combination and arrangement hereinafter fully described with reference to the accompanying drawings, wherein:

Figure 3 is a view in transverse section to an enlarged scale of a portion of the improved wheel.

Figure 4 is a view in longitudinal section to an enlarged scale of a portion of the rim and tyre of the improved wheel.

Figure 5 illustrates in vertical section a modified spoke construction.

Figure 6 is an elevation of a portion of the improved wheel embodying the spoke construction illustrated in Figure 5.

Figure 1:
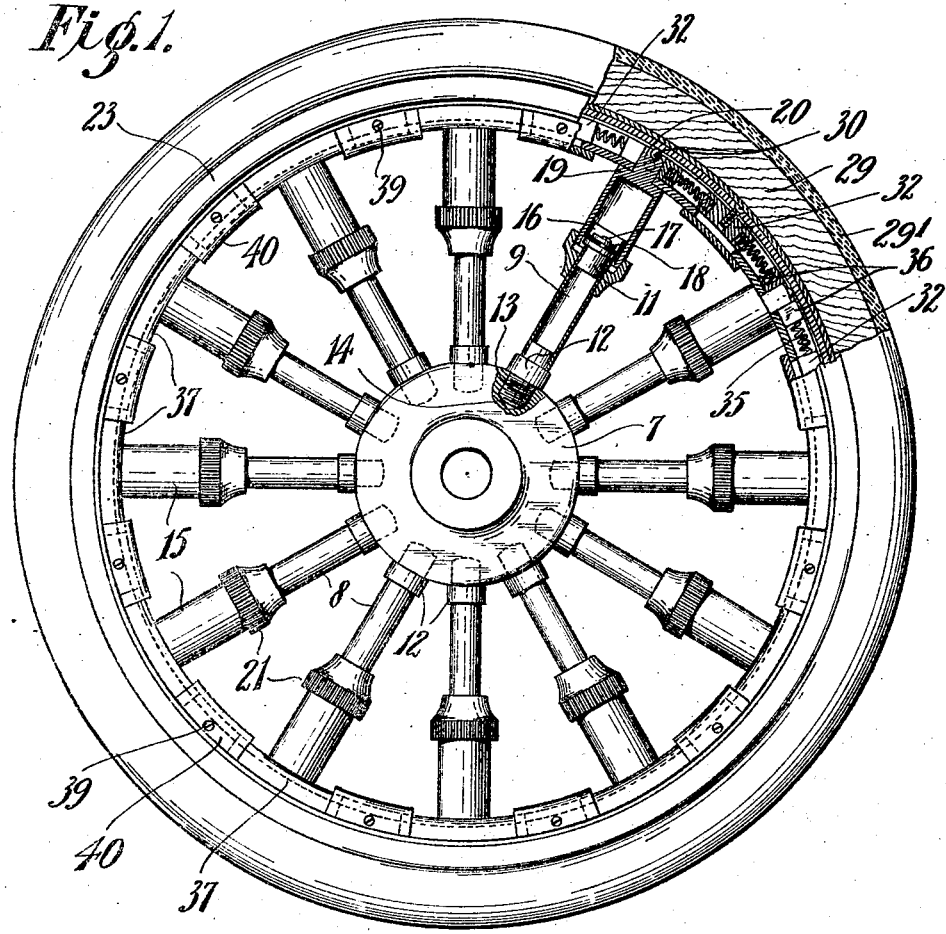
Figure 1 is a side elevational view of the improved pneumatic wheel.
Figure 2:
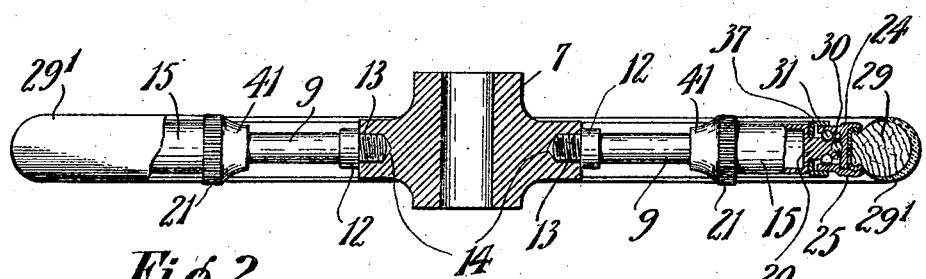
Figure 2 is a view, partly in transverse section and partly in plan, of the wheel shown in Figure 1.

In these drawings the numeral 7 designates a wheel hub which is preferably of metal and can be made by casting, forging or machining. Secured radially around said hub are a series of spokes 8, each of which comprises a tubular portion 9, a solid metal hub-piece 10 and piston head 11. The hub-piece 10 and the piston 11 are secured to the tube by pinning and brazing or by other suitable means known in the metal working art. The hub-pieces 10 of the spokes are furnished with collars 12 and screw-threaded stems 13, which latter are adapted to screw into the tapped holes 14 in said hub 7. Slidably mounted over each piston head 11 is an air cylinder 15, and within the latter is a piston-leather 16 which is secured to said piston head 11 by means of a screw 17 and a washer 18.

Extending outwardly and axially from the closed end 19 of each of said air cylinders 15 is an extension or boss 20, and detachably fitted as by screw-threads to the opposite end of said cylinder is a bush or gland 21 having an orifice 22 in which slides the tubular portion 9 of the spoke.

A rim 23 of the improved wheel is constructed in two annular parts 24 and 25 furnished with suitable means as screw-threads 26 for their detachable connection. The annular portions of the rim 23, when screwed or otherwise clamped together, form on their inner side an annular race 27 and around their outer periphery there is secured a detachable tyre channel 28 preferably formed in two parts from sheet metal as by rolling operations.

Clamped within the tyre channel 28 is a tyre 29, which is preferably made of wood. To said tyre 29 there is secured as by vulcanization, a solid rubber tread $29^1$.

The bosses 20 on the air cylinders 15 are designed to fit within said race 27 in the rim 23, and they are each furnished with anti-frictional and thrust devices, the preferred form of which is a ball 30 for the axial thrust and balls 31 for the side thrust, the race 27 being thereby employed as a ball race. Interposed in said race 27 between each pair of spokes 8 is a metal block 32 secured to the rim by a screw 33. Formed in the ends of said blocks 32 are recesses 34 each of which is adapted to receive and seat one end of a coiled spring 35. Thrust-pockets 36 at either side of each boss 20 are slidable in the race 27 and are adapted to receive the free ends of the coiled springs 35.

To each of the cylinders 15 at its closed end there is attached a cover 37 which extends over the raceway 27 and around the inner periphery 38 of the rim 23. Secured to said rim by screws 39 are outer covers 40, which fit slidably over said covers 37 and in conjunction with the latter function to prevent the ingress of dust or other foreign matter to the race, and to prevent the egress of lubricant therefrom.

The glands 21 have elongated necks 41 surrounding the orifices 22 in order to provide long bearings for the spokes of the wheel.

According to the modified construction, illustrated in Figures 5 and 6 of the drawings, the spokes are substantially of the same appearance externally as an ordinary wheel of the artillery type, and this feature viewed in conjunction with the rubber tread and wooden base tyre, having a cross section similar to that of an ordinary pneumatic tyre and cover, renders it difficult to distinguish between a wheel of the artillery type fitted with pneumatic tyres, and an automatically operating pneumatic wheel according to the invention.

In the modified construction the air cylinder 15 is formed of comparatively thin tubular material, and the gland 21 is entirely dispensed with.

The tubular portion 9 of the spoke 8 is extended into said air cylinder 15 and is fitted with a cap 42 and a leather 16 to form a piston head $11^1$. Piston rings 43 are fitted in said piston head; and these are preferably in the form of felt rings inserted in grooves in the outer wall of said piston head $11^1$.

When the improved pneumatic wheel is in use on a vehicle, such as a motor-car, the load is transmitted from the axle of the car to the tyre of the wheel through a plurality of air-cushions formed by the spoke construction described and which air-cushions permit of a slight eccentricity of the wheel rim 23 relatively to the hub 7. Owing to this action, as the wheel revolves after the application of power to the driving axle of the vehicle, the air cylinders 15 reciprocate upon the piston heads 11 and thereby act as air compressors and furnish an efficient pneumatic support for the vehicle.

The race way 27 and the balls fitted to the bosses 20 provide means for the consequent angular displacement of said rim 23 relatively to the spokes 8 with a minimum of frictional loss of energy.

Power from the axle is not transmitted directly through the spokes 8 to the rim 23 by means of rigid connections, but is transmitted resiliently through the coiled springs 35 to the fixed blocks 32. The rubber tread functions to pass resiliently over a small obstacle, whilst employment of the wood base 29 effects an economy in the use of rubber, and at the same time strengthens the mechanical combination of the improved wheel.

Ready access to the working parts of the wheel is afforded by the provision of the two-part rim 23, which also facilitates and effects economy in the operations of assembling or dissembling the parts of the wheel.

What I do claim is:—

1. A wheel of the class described having a hub, tubular spokes secured to the hub, piston heads at the outer ends of said tubular spokes, cylinders fitting over said piston heads, a rim to which said cylinders are connected, and glands detachably connected to the inner ends of the cylinders and having openings through which the tubular spokes extend.

2. A wheel comprising a hub, spokes having pistons at their outer ends, cylinders in which the spokes operate, a rim having races in its inner side, bosses at the outer ends of the cylinders and arranged in the races, covers at the outer ends of the cylinders, extending over the races and the inner periphery of the rim, and outer covers secured to the rim and slidably fitted over the first named covers.

In testimony whereof I affix my signature in presence of two witnesses.

HUBERT CHARLES BAQUIE.

Witnesses:
JAMES H. ANDERSON,
J. B. SYMES.